(12) United States Patent
Oppitz et al.

(10) Patent No.: US 6,655,505 B2
(45) Date of Patent: Dec. 2, 2003

(54) PARKING BRAKE ACTUATING DEVICE FOR A PARKING BRAKE ARRANGEMENT IN A MOTOR VEHICLE

(75) Inventors: Horst Oppitz, Dittelbrunn (DE); Stephan Benkert, Bad Brückenau (DE)

(73) Assignee: Mannesmann Sachs AG, Schweinfurt (DE)

( * ) Notice: Subject to any disclaimer, the term of this patent is extended or adjusted under 35 U.S.C. 154(b) by 32 days.

(21) Appl. No.: 10/037,140

(22) Filed: Jan. 3, 2002

(65) Prior Publication Data

US 2002/0092710 A1 Jul. 18, 2002

(30) Foreign Application Priority Data

Jan. 13, 2001 (DE) .......................... 101 01 363

(51) Int. Cl.[7] .............................................. F16D 63/00
(52) U.S. Cl. ..................... 188/82.77; 188/69; 188/31; 188/196 BA
(58) Field of Search ................ 188/69, 31, 60, 188/2 D, 82.1, 82.7, 82.77, 196 B, 196 BA

(56) References Cited

U.S. PATENT DOCUMENTS

| 3,703,941 | A | * | 11/1972 | Ohie et al. ..................... 188/31 |
| 3,912,050 | A | * | 10/1975 | Iwanaga et al. ................ 188/69 |
| 3,990,541 | A | * | 11/1976 | Dobrinska et al. ............. 188/31 |
| 4,200,002 | A | * | 4/1980 | Takahashi ..................... 74/530 |
| 4,369,867 | A | * | 1/1983 | Lemieux .................... 192/219.5 |
| 4,518,066 | A | * | 5/1985 | Barr ........................ 192/219.5 |
| 4,546,295 | A | * | 10/1985 | Wickham et al. ............ 318/372 |
| 4,614,256 | A | * | 9/1986 | Kuwayama et al. ...... 192/219.5 |
| 4,671,133 | A | * | 6/1987 | Yamada ........................ 74/530 |
| 5,217,094 | A | * | 6/1993 | Walter et al. ................ 188/2 D |
| 5,704,457 | A | | 1/1998 | Kimura et al. .............. 192/4 A |
| 5,794,748 | A | * | 8/1998 | Heuver et al. ............. 192/220.2 |
| 5,964,335 | A | * | 10/1999 | Taniguchi et al. ......... 192/219.5 |
| 6,065,581 | A | * | 5/2000 | Nogle ...................... 192/219.5 |
| 6,279,713 | B1 | * | 8/2001 | Young et al. ............. 192/219.5 |
| 6,300,868 | B1 | * | 10/2001 | Barr ........................... 340/457 |
| 6,332,257 | B1 | * | 12/2001 | Reed et al. ................. 29/401.1 |

FOREIGN PATENT DOCUMENTS

| DE | 195 33 141 | | 2/1997 | |
| EP | 0990569 | * | 4/2000 | |
| WO | WO 98/04430 | | 2/1998 | ........... B60K/41/26 |

OTHER PUBLICATIONS

Drach, Hansjörg: PKW–Automatgetriebe, Landsberg/Lech: Verl. Moderne Industrie, 1994, Seiten 24 u. 25.

* cited by examiner

Primary Examiner—Christopher P. Schwartz
Assistant Examiner—Devon Kramer
(74) Attorney, Agent, or Firm—Cohen, Pontani, Lieberman & Pavane

(57) ABSTRACT

A parking brake actuating device includes a rotary lever arrangement in operative connection with a compensation device providing an idle path and a restoring element for controlling the rotary lever arrangement. The rotary lever arrangement controls the engagement of a blocking member with a counter-blocking member of the parking brake arrangement. The rotary lever arrangement has a rotary lever input part and a rotary lever output part and the idle path of the compensation device can be constructed so as to be in an operative connection between the rotary lever input part and the rotary lever output part.

37 Claims, 5 Drawing Sheets

PARKING BRAKE ACTUATING DEVICE FOR A PARKING BRAKE ARRANGEMENT IN A MOTOR VEHICLE

BACKGROUND OF THE INVENTION

1. Field of the Invention

The invention is directed to a parking brake actuating device for a parking brake arrangement in a motor vehicle, the device comprising a rotary lever arrangement in operative connection with a compensation device providing an idle path and a restoring element for controlling the rotary lever arrangement, which in turn controls the engagement of a blocking member with a counter-blocking member of the parking brake arrangement.

2. Description of the Related Art

Parking brake arrangements are known in general in vehicles with hydrodynamic torque converters and serve to prevent the vehicle from rolling away accidentally when the engine is turned off by blocking the transmission output shaft which is connected with the driving wheels so as to be fixed with respect to rotation relative to them. Parking brake arrangements are also applied in electrically driven motor vehicles. As a rule, these vehicles do not have a standard transmission because the electric engine which is provided for driving can deliver a usable torque over an appreciably broader range of speeds in any driving situation compared to an internal combustion engine. Here, also, it is necessary to block a drive shaft which is connected with the driving wheels so as to be fixed with respect to rotation relative to them in order to prevent the parked vehicle from rolling away accidentally. This drive shaft can be the rotor shaft of the electric engine, for example. Vehicles of the type mentioned above usually have a selector lever for selecting the parking gear and different driving gears, this selector lever being in an operative connection with the parking brake arrangement. The position of the selector lever selected by the driver is locked by a locking device until another gear is selected.

There are already numerous known arrangements for blocking a shaft which is connected with the driving wheels so as to be fixed with respect to rotation relative to them and which generally comprises a locking member and counter-locking member. However, such arrangements are not the subject of the invention. The parking brake actuating device discussed herein is directed instead at means for the articulation of the blocking device.

A parking brake arrangement with a parking brake actuating device of the type mentioned above is known, for example, from DE 195 33 141 C1. The parking brake arrangement described therein comprises a toothed parking brake wheel and, further, a pawl which is rotatably supported so as to be fixed with respect to the housing and which has a projection that can engage in a gap in the parking brake wheel and accordingly prevents the vehicle from rolling by means of a positive engagement. The articulation of the pawl is carried out by means of a cam roller located at a lever of a rotary lever arrangement, wherein the other lever of the rotary lever arrangement is in an operative connection with the selector lever with a Bowden cable or rod linkage, a tension spring being arranged in the force flow of the latter. The rotary lever arrangement further comprises a torsion spring or leg spring which is arranged at this rotary lever arrangement and at the housing. When the driver moves the selector lever into the parking position, the force is directed to the pawl via the elements arranged in the force flow and the projection is pressed into a gap in the blocking wheel. The leg spring is tensioned at the same time. When a tooth of the blocking wheel and the projection of the pawl are radially across from one another during actuation of the selector lever and the pawl can not lock in, the tension spring expands while providing a free travel or an idle path. When the selector lever is moved from the parking gear to a driving gear, the tension spring relaxes again and the rotary lever arrangement is moved back into its initial position again by the restoring action of the leg spring with assistance from another leg spring connected with the pawl.

In principle, the parking brake actuating device described above satisfies the functional requirements demanded of it. However, developments in automotive engineering have aimed increasingly at the use of ready-to-install component assemblies. In this way, mounting to the vehicle is simplified, the range of uses for the respective component assembly is expanded to different vehicles and, further, ease of maintenance is improved. In this respect, the described parking brake actuating device has disadvantages. For example, numerous individual components of the parking brake actuating device are arranged in the interior of a housing, e.g., a transmission casing or housing of an electric motor, in such a way that they must be mounted in the installed position before the corresponding housing is assembled. Therefore, maintenance or repair of the parking brake actuating device requires time-intensive and cost-intensive labor. Another disadvantageous feature is the locking arrangement which is in an operative connection with the parking brake actuating device. Although closely connected with respect to function, the parking brake actuating device and the locking arrangement are fitted to different mounting locations in the vehicle. This feature also disadvantageously impedes application of a particular embodiment form of the above-mentioned type of parking brake actuating device to different types of vehicles, for example, vehicles of a platform.

SUMMARY OF THE INVENTION

On this basis, it is the object of the invention to provide a compact, universally applicable parking brake actuating device which is easy to mount and which overcomes the disadvantages of the prior art mentioned above.

According to the invention, the rotary lever arrangement has a rotary lever input part and a rotary lever output part, wherein the idle path of the compensation device can be constructed so as to be in an operative connection between the rotary lever input part and the rotary lever output part.

The invention is based upon the main idea that the rotary lever arrangement which to was formerly constructed in one part now comprises multiple parts, namely, a rotary lever input part and a rotary lever output part, and that the latter are arranged and constructed in such a way that, when necessary, a torque introduced via the rotary lever input part is conducted to the rotary lever output part not immediately but with a time delay by means of providing an idle path. This requirement occurs when a working operative connection can temporarily not be established between the blocking member and counter-blocking member of the parking brake arrangement because of their relative position.

In an advantageous further development of the invention, the rotary lever input part and/or rotary lever output part are/is mounted so as to be rotatable in a flange component part. With this flange component part, the parking brake actuating device can be fitted to a mounting location provided for it and can be used to transmit torque from the rotary lever input part to the rotary lever output part.

It is further advantageous that the flange component part is arranged so as to be stationary with respect to a housing of the parking brake arrangement. The position of the parking brake actuating device relative to a blocking member and counter-blocking member of the parking brake arrangement is accordingly defined and a reliable operation of the parking brake arrangement is ensured.

In another advantageous construction, the housing has a through-opening at least for the rotary lever output part. Accordingly, at least one part of the parking brake actuating device can be inserted into the housing from the outside. This construction constitutes a significant advantage over previous parking brake actuating devices because it is now possible to mount this device after the housing has been assembled. Enormous savings in cost and time can also be achieved in this way when maintenance and repair work is required.

The rotary lever input part advantageously has a shaft portion which is mounted inside the flange component part so as to be swivelable.

The rotary lever input part is preferably in an operative connection with a manual actuator or an actuator that is supplied by external energy. This actuator carries out an adjusting movement depending on a control command and introduces torque into the rotary lever input part.

The actuator supplied by external energy is preferably constructed as an electric motor and comprises means for determining a switching position of the rotary lever input part. In this case, the adjusting movement can be carried out immediately practically without a time delay after a control command is given. When the actuator has an angle sensor or displacement sensor, the switching position of the rotary lever input part can be determined directly from this detected position.

In a preferred arrangement, the electric motor actuator is arranged coaxial to the axis of rotation of the rotary lever input part. In this case, it is possible to adapt the electric motor actuating member in a particularly simple manner, e.g., by means of a simple sleeve which connects the rotary lever input part with the shaft of an electric motor.

In a further advantageous step, the idle path of the compensation device is provided by the rotary lever input part or the rotary lever output part. For this purpose, the respective part is constructed in a corresponding manner. Alternatively, it is also possible to arrange the idle path in such a way that it can not be allocated to either of the two parts mentioned above, but rather only results from cooperation with other elements.

In a particularly advantageous construction, the two rotary lever parts have coupling surfaces which determine the idle path and enable a transmission of the switching movement from the rotary lever input part to the rotary lever output part. The coupling surfaces of the one rotary lever part accordingly constitute boundaries of the idle path on both sides, whereas those of the other respective rotary lever part function as drivers.

At least one of the two parts advantageously has a segment-shaped cutout in circumferential direction to provide the idle path. The coupling surfaces can accordingly be produced in a particularly simple manner with respect to manufacturing technique.

It is further advantageous that the idle path is limited by a stop element during a relative movement of the rotary lever input part and rotary lever output part.

The stop element is preferably formed by a pin which projects radial to the longitudinal axis of one of the two rotary lever parts. This construction best performs the function and is easily realized.

Another essential feature of the invention consists in that the restoring element of the compensation device is anchored at the rotary lever output part and at the rotary lever input part. In this way, the invention advantageously sets itself apart from the solution known from the prior art.

The restoring element of the compensation device is advantageously formed by a spring. A leg spring, for example, is suitable for this purpose.

The rotary lever input part and the rotary lever output part are advantageously connected with one another such that they are secured axially. This step for allocating the parts mentioned above also proves advantageous for a simple assembly.

In a particularly advantageous construction, the rotary lever output part is constructed as a shaft and is arranged coaxial to the rotary lever input part.

In another construction, the rotary lever output part has a roller lever with a freely rotatable roller. The rotary lever output part can accordingly be brought into an operative connection with a blocking member of the parking brake arrangement, for example, a locking pawl, in a particularly simple manner.

In another construction, the rotary lever arrangement has a locking arrangement by which a plurality of defined switching states may be fixed based on the preset of a selector device. This construction likewise clearly sets itself apart from the prior art in an advantageous manner. In this way, functional units which are connected with one another with respect to function are also joined with respect to location, that is, in a functional unit.

The locking arrangement advantageously comprises at least one pretensioned locking device which enters into connection with a counter-locking device when a defined switching state is reached.

The at least one locking device can advantageously enter into connection with one of a plurality of counter-locking devices arranged on a common pitch circle at the flange component part or at the rotary lever input part. Accordingly, one or more defined switching states can be realized by a rotational movement of the rotary lever input part relative to the flange component part.

In a still more advantageous variant, a plurality of locking devices are arranged at the flange component part or rotary lever input part at an axial distance from one another and enter into connection, respectively, with one of a plurality of counter-locking devices which are arranged on the other respective part so as to be offset axially and in circumferential direction. In this way, a plurality of defined switching states can be occupied successively by means of the locking arrangement with only a relatively slight swiveling of the rotary lever input part.

The rotary lever arrangement advantageously has means for sensing a position of the rotary lever output part relative to the rotary lever input part. When the position of the rotary lever input part is known based on the fact that a determined locking position is occupied, as was described above by way of example, and the movement of the rotary lever output part is sensed in addition, it can be deduced from this information whether or not a blocking member engages with a counter-blocking member of the parking brake arrangement.

The construction according to the invention makes it possible for the rotary lever arrangement to be preassembled as a constructional unit and to be positioned in operative connection to the blocking member from the outside through the through-opening of the housing. In this way, a considerable simplification is achieved compared with the assembly of a known parking brake actuating device.

At least one of the rotary lever parts advantageously has a stepped contour, wherein a shoulder of the step constitutes an axial bearing surface for supporting the rotary lever input part relative to the rotary lever output part.

The parking brake actuating device according to the invention will be described in the following with reference to different embodiment examples. In the description of the individual embodiment examples, identical or analogous parts are designated by the same reference numbers supplemented by the letters a, b, c or d and only differences relative to previously discussed embodiment examples are described. To this extent, reference is had expressly to the description of the embodiment example or embodiment examples already discussed.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
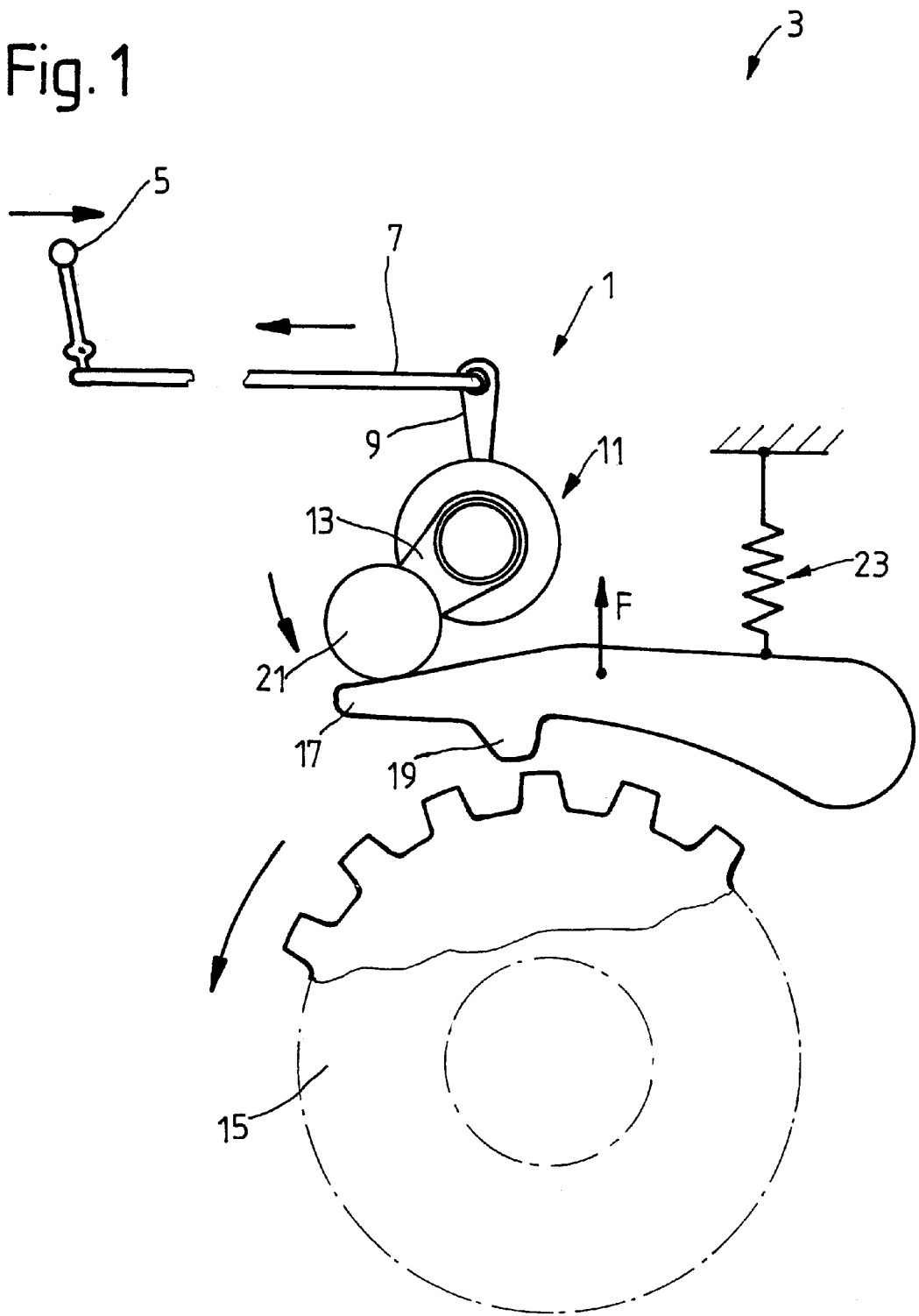
FIG. 1 is a schematic view of the basic construction of a parking brake using a parking brake actuating device according to the invention.

FIG. 1 shows a parking brake actuating device 1, by way of example, in a parking brake arrangement 3 in a motor vehicle. When a driver moves the selector device 5 into a parking position, an actuating force is transmitted by means of a transmission element 7, in this case, a mechanism, to an input part 9 of a rotary lever arrangement 11, wherein a torque is generated at the latter. The rotary lever arrangement 11 further has a rotary lever output part 13. The object of the rotary lever arrangement 11 is to further convey the torque introduced via the rotary lever input part 9 to the rotary lever output part 13, wherein the rotary lever output part 13 executes a rotational movement only when a counter-force F which is dependent on the position of a blocking member relative to a counter-blocking member of the parking brake arrangement 3 is overcome. In the example, the blocking member is a toothed parking brake wheel 15 and the counter-blocking member is a pawl 17 which is mounted in a rotatable manner so as to be fixed with respect to the housing and which has a projection 19 which can engage in a gap of the parking brake wheel 15 and accordingly prevents the motor vehicle from rolling away by means of a positive engagement. The articulation of the pawl 17 is carried out by means of a cam roller 21 which is connected with the rotary lever output part 13. In case a tooth of the blocking wheel 15 and the projection 19 of the pawl 17 are located across from one another radially when the parking brake actuating device 1 is actuated, there is a sufficiently large counter-force F available which blocks a movement of the rotary lever output part 13 with respect to the pawl 17. Otherwise, there is only a counter-force F which is caused by the action of the restoring element 23 and which enables a movement of the rotary lever output part 13 and, therefore, makes it possible for the pawl 17 to lock into a gap of the parking brake wheel 15.

The construction and the function of the parking brake actuating device according to the invention will be explained in detail with reference to FIG. 2.

The parking brake actuating device 1a comprises, as essential functional unit, the rotary lever arrangement 11a having the rotary lever input part 9a and the rotary lever output part 13a, both of which are constructed as shafts and are arranged coaxial to one another. The rotary lever output part 13a has a radially stepped contour, wherein two shaft portions 25 and 27 and a shoulder 29 are formed. The shaft portion 27 extends through an axial opening 31 of the rotary lever input part 9a, its end projecting beyond the latter and carrying a retaining ring 33. The shoulder 29 provides an axial bearing surface for supporting the rotary lever input part 9a relative to the rotary lever output part 13a. In connection with the retaining ring 33, the rotary lever input part 9a and the rotary lever output part 13a are connected with one another so as to be secured axially. The rotary lever input part 9a has an axial recess 35 which partially receives the shaft portion 27 of the rotary lever output part 13a and a bearing 37.

The rotary lever input part and rotary lever output part 9a, 13a are constructed in such a way that torque acting on one of the parts 9a, 13a is conveyed on to the other part. Further, an idle path is carried out in operative connection between the rotary lever input part 9a and the rotary lever output part 13a, so that a compensation device 39 is provided, as will be explained in the following. In addition, in FIG. 3, the rotary lever input part 9b contains a cutout 41 in the area of the axial recess 35b, which cutout 41 is segment-shaped in circumferential direction and is defined by coupling surfaces 43, 45. The cutout 41 between the coupling surfaces 43, 45 accordingly constitutes an idle path. Within the axial extension of the coupling surfaces 43, 45, the rotary lever output part 13b has a pin 47b projecting radial to the longitudinal axis, wherein the surfaces 49, 51 of the pin which face the first coupling surfaces form second coupling surfaces. The pin 47b accordingly functions as a stop element. The maximum idle path given by the first coupling surfaces is limited depending on the distance between the two second coupling surfaces and can accordingly easily be adapted to specific requirements. In FIG. 2, the compensation device 39 further comprises a restoring element 53 in the form of a leg spring which is anchored at the ends to the rotary lever input part 9a and to the rotary lever output part 13a. In an initial position, the pin 47 of the rotary lever output part 13a contacts a coupling surface 45 of the rotary lever input part 9a. The idle path covered by the rotary lever output part 13a relative to the rotary lever input part 9a corresponds to a defined change in the rotational angle of the parking brake wheel 15. The idle path is at least large enough so that the latter corresponds to the angle enclosed by two gaps and the center of the parking brake wheel 15. This enables a reliable operation of the compensation device 39.

Figure 4:
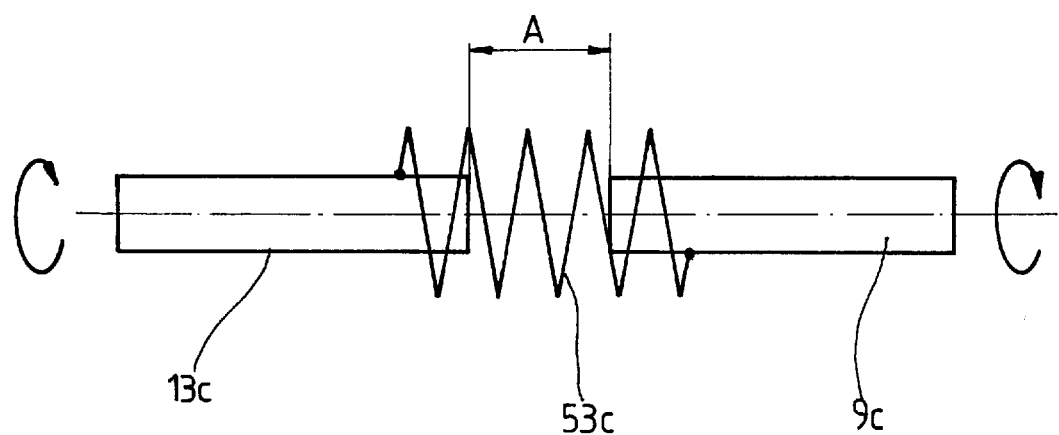
FIG. 4 is a schematic view showing an idle path implemented in a rotary lever arrangement.

However, the idle path need not necessarily be allocated to only one of the rotary lever parts 9*a* or 13*a*. As is shown schematically in FIG. 4, the idle path can also be constructed as a shared property of the rotary lever parts 9*c* and 13*c* in that a distance A formed by a leg spring 53*c* occurs between the parts in axial direction. When a counter-force F occurs during actuation corresponding to the preceding explanations, the spring is tensioned, wherein the distance between the rotary lever parts 9*c* and 13*c* is decreased at the same time.

Figure 2:
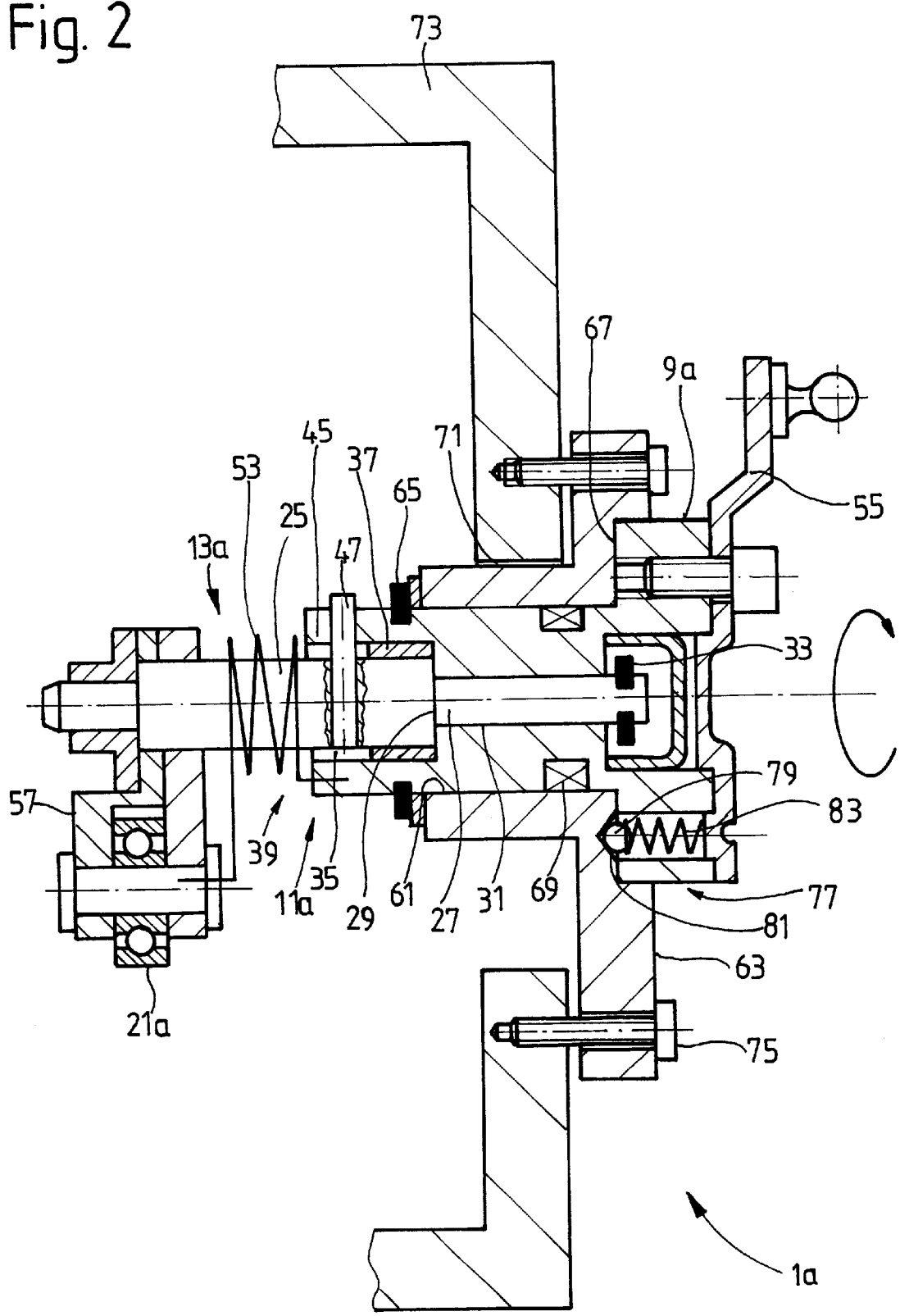
FIG. 2 is a sectional view of a parking brake actuating device according to the invention.
Figure 3:
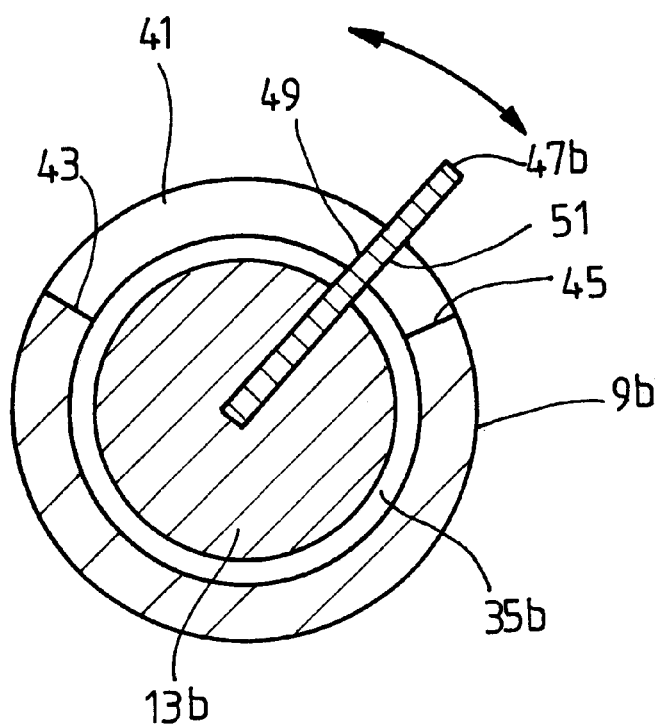
FIG. 3 is a sectional view of the rotary lever input part in the area of the compensation device.

In FIG. 2, a connection piece 55 is connected with the rotary lever input part 9*a* so as to be fixed with respect to rotation and produces a working connection with an actuator, not shown in the drawing, which operates manually or is supplied by external energy. A Bowden cable or rod linkage can be used as a manual actuator; an electric motor is preferably provided as an actuator that is supplied by external energy. Its drive shaft can be arranged coaxial to the axis of rotation of the rotary lever input part or also, e.g., in connection with a gear unit, parallel to or at an angle to the latter. The electric motor likewise comprises means, not shown in the drawing, for determining a switching position of the rotary lever input part. For this purpose, there can be a rotational angle sensor with an evaluating unit or a mechanical driver which actuates feelers in the end positions to generate an electric signal.

The rotary lever arrangement 11*a* can likewise include means for sensing a position of the rotary lever output part 13*a*. For this purpose, for example, a switching device, not shown in the drawing, can be provided at the rotary lever input part 9*a* in the area of the segment-shaped cutout, wherein a first element of the switching device is connected with the rotary lever input part 9*a* and a second element is formed by the pin of the rotary lever output part 47 or is in a working connection therewith.

In order to transmit force onward to the side remote of the rotary lever input part 9*a*, the rotary lever output part 13*a* has a roller lever 57 with the freely rotatable cam roller 21*a*, this roller lever 57 being arranged so as to be fixed with respect to rotation.

When the parking brake actuating device 1*a* is actuated corresponding to the swiveling direction indicated by an arrow in FIG. 2, a torque introduced via the rotary lever input part 9*a* is conducted via the leg spring 53 and further to the rotary lever output part 13*a* connected to the latter. When the projection 19 of the locking pawl 17 is located over a gap of the parking brake wheel 15 as shown in FIG. 1, the rotary lever output part 13*a* in FIG. 2 rotates synchronous with the rotary lever input part 9*a*, wherein the cam roller 21*a* arranged at the roller lever 57 rolls on the locking pawl 17 and brings the latter into engagement with the parking brake wheel 15. However, when a sufficiently large counter-force F occurs in the course of the rotating movement of the rotary lever output part 13*a*, above all when the projection 19 and a tooth of the parking brake wheel 15 are located radially opposite one another and an engagement is not possible, the synchronous rotational movement of the rotary lever output part 13*a* with the rotary lever input part 9*a* is blocked and further rotation of the rotary lever input part 9*a* causes a tensioning of the leg spring 53 while traveling the idle path. During this period of time, the ratchet wheel 15 continues to rotate until the next possible locking position is reached. As soon as this happens, the counter-force F decreases and the rotary lever output part 13*a* can continue to rotate in the swiveling direction accompanied by simultaneous relaxation of the leg spring 53, and the projection 19 locks into a gap in the ratchet wheel 15. At the same time, the rotary lever output part 13*a* is restored to its initial position with respect to the input part 11*a*.

When the parking brake actuating device 1*a* is actuated corresponding to the swiveling direction indicated by an arrow in FIG. 2, a torque introduced via the rotary lever input part 9*a* is conducted via the leg spring 53 and further to the rotary lever output part 13*a* connected to the latter. When the projection 19 of the locking pawl 17 is located over a gap of the parking brake wheel 15 as shown in FIG. 1, the rotary lever output part 13*a* in FIG. 2 rotates synchronous with the rotary lever input part 9*a*, wherein the cam roller 21*a* arranged at the roller lever 57 rolls on the locking pawl 17 and brings the latter into engagement with the parking brake wheel 15. However, when a sufficiently large counter-force F occurs in the course of the rotating movement of the rotary lever output part 13*a*, above all when the projection 19 and a tooth of the parking brake wheel 15 are located radially opposite one another and an engagement is not possible, the synchronous rotational movement of the rotary lever output part 13*a* with the rotary lever input part 9*a* is blocked and further rotation of the rotary lever input part 9*a* causes a tensioning of the leg spring 53 while traveling the idle path. During this period of time, the ratchet wheel 15 continues to rotate until the next possible locking position is reached. As soon as this happens, the counter-force F decreases and the rotary lever output part 13*a* can continue to rotate in the swiveling direction accompanied by simultaneous relaxation of the leg spring 53, and the projection 19 locks into a gap in the ratchet wheel 15. At the same time, the rotary lever output part 13*a* is restored to its initial position with respect to the input part 11*a*.

The rotary lever input part 9*a* is supported by a shaft portion 61 so as to be rotatable in a flange component part 63 and is secured against axial movement by a retaining ring 65 and a shoulder 67. In addition, sealing means 69 formed as a ring are provided for preventing liquid from passing between the parts 63 and 9*a*. The flange component part 63 is arranged so as to be stationary at a through-opening 71 of a housing 73 of the parking brake arrangement 1*a* by means of a detachable connection 75, for example, the screw connection shown in the drawing. In this case, also, sealing means, not shown, can be provided between the flange component part 63 and the housing 73. The through-opening 71 is dimensioned in such a way that the rotary lever output part 13*a* can be guided through it. Alternatively, it would also be possible for the rotary lever input part 9*a* by itself or the input part and output part of the rotary lever arrangement 11*a*, 13*a* together to be supported in a flange component part. The rotary lever arrangement 11*a* can be preassembled as a constructional unit and can be positioned in a working connection with the blocking member from the outside through the through-opening 71 of the housing 73.

According to a further feature of the invention, a locking arrangement 77 is formed at the rotary lever arrangement 1*a* by which a plurality of defined switching states can be fixed successively in time, according to the preset of a driver, by means of a deflection of the connection piece 55 and of the rotary lever input part 9*a* connected with the latter. The maximum deflection causes the parking position to be occupied and different driving gears can be occupied by means of lesser deflections. For this purpose, the locking arrangement 77 comprises a pretensioned locking device 79 in the form of a spring-loaded ball which enters into a connection with a counter-locking device 81 formed at the flange component part as a trough when a defined switching state is reached. The spring 83 is supported by the connection piece 55 in the example; however, this can also be carried out by means of the rotary lever input part 9a. It is essential that the locking device or locking devices 79 and the counter-locking device or counter-locking devices 81 are positioned at the rotary lever input part 9a and at a part which is stationary with respect to the latter. In the example, the locking devices 79 and counter-locking devices 81 are formed at identical pitch circles of the flange component part 63 and the connection piece 55 and rotary lever input part 9a.

Figure 5:
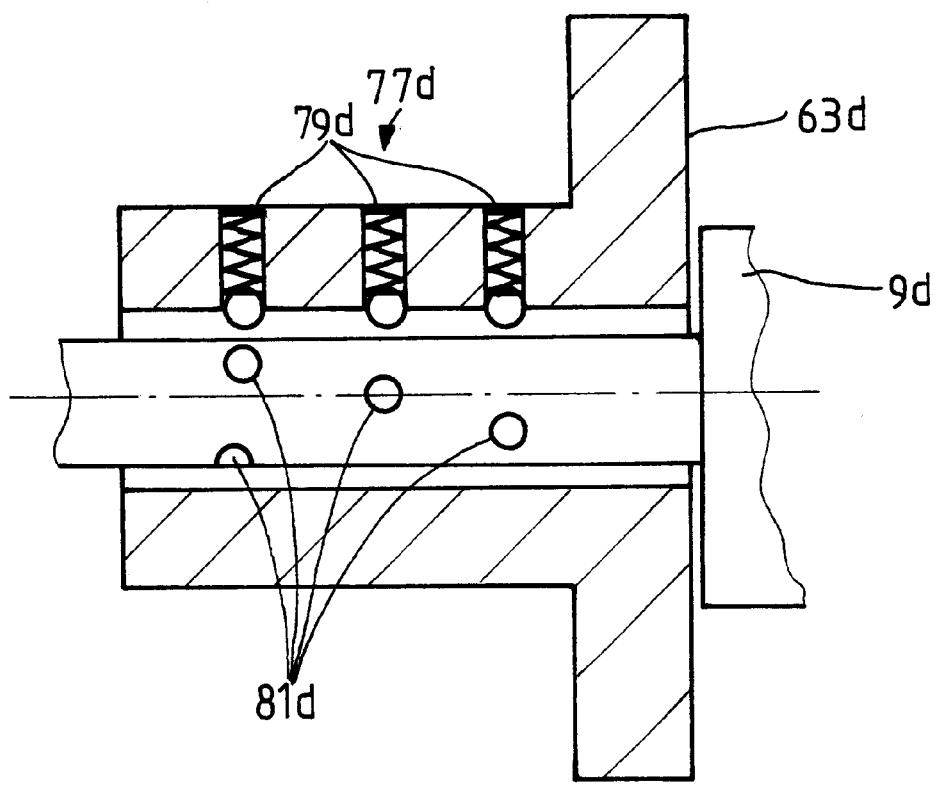
FIG. 5 is a schematic view of a locking arrangement in a parking brake actuating device according to the invention.

A further variant of a locking arrangement 77d is shown schematically in FIG. 5. Three locking devices 79d are arranged at a distance from one another axially at the flange component part 63d. The counter-locking devices 81d are likewise spaced apart axially but, in addition, are arranged at the rotary lever input part 9d so as to be offset in circumferential direction. The locking arrangement 77d can be built in a very compact manner by means of this construction and a plurality of switching states can be secured successively by means of only slight deflections of the connection piece 55 in FIG. 2.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A parking brake actuating device for a parking brake arrangement in a motor vehicle, said parking brake arrangement comprising a blocking member and a counter-blocking member, said actuating device comprising:

a rotary lever arrangement which controls engagement of the blocking member with the counter-blocking member, said rotary lever arrangement comprising a rotary lever input part and a rotary lever output part which are rotatable relative to each other along an idle path when said blocking member is not engaged by said counter-blocking member, an actuator in operative connection with said rotary input part, said actuator comprising an electric motor and means for determining a switching position of the rotary lever input part, and a restoration element which reverses said idle path when said counter-blocking member engages said blocking member.

2. A parking brake actuating device as in claim 1 further comprising a flange component, at least one of said rotary lever input part and said rotary lever output part being rotatably mounted in said flange component.

3. A parking brake actuating device as in claim 2 wherein said parking brake arrangement comprises a housing, said flange component being stationary with respect to said housing.

4. A parking brake actuating device as in claim 3 wherein said housing has a through-opening for said rotary lever output part.

5. A parking brake actuating device as in claim 2 wherein said rotary lever input part has a shaft portion which is rotatable in said flange component.

6. A parking brake actuating device as in claim 1 wherein said electric motor is arranged coaxial to the axis of rotation of the rotary lever input part.

7. A parking brake actuating device as in claim 1 wherein the idle path is defined by one of said rotary lever input part and said rotary lever output part.

8. A parking brake actuating device as in claim 1 further comprising a stop element which limits the rotation of the rotary lever input part relative to the rotary lever output part.

9. A parking brake actuating device as in claim 8 wherein said stop element comprises a pin which extends radially from the rotational axis of one of the rotary lever input part and the rotary lever output part.

10. A parking brake actuating device as in claim 1 wherein said restoring element is anchored to the rotary lever input part and to the rotary lever output part.

11. A parking brake actuating device as in claim 1 wherein said restoring element comprises a spring.

12. A parking brake actuating device as in claim 1 wherein the rotary lever input part and the rotary lever output part are axially secured.

13. A parking brake actuating device as in claim 1 wherein said rotary lever output part comprises a shaft which is coaxial to the rotary lever input part.

14. A parking brake actuating device as in claim 1 wherein at least one of the rotary lever input part and the rotary lever output part comprises a shoulder which forms an axial bearing surface for axially supporting the rotary lever input part relative to the rotary lever output part.

15. A parking brake actuating device as in claim 1 wherein said rotary lever output part comprises a roller lever having a freely rotatable roller.

16. A parking brake actuating device as in claim 1 wherein said rotary lever arrangement comprises means for sensing the position of the rotary lever output part relative to the rotary lever input part.

17. A parking brake actuating device as in claim 1 further comprising a housing having a through-opening, said rotary lever arrangement being preassembled and positioned in operative connection to said blocking member through the through-opening of the housing.

18. A parking brake actuating device for a parking brake arrangement in a motor vehicle, said parking brake arrangement comprising a blocking member and a counter-blocking member, said actuating device comprising:

a rotary lever arrangement which controls engagement of the blocking member with the counter-blocking member, said rotary lever arrangement comprising a rotary lever input part and a rotary lever output part which are rotatable relative to each other along an idle path when said blocking member is not engaged by said counter-blocking member, and a locking arrangement by which a plurality of defined switching states can be selected, said locking arrangement comprising at least one pretensioned locking device and a plurality of counter-locking devices, said locking device cooperating with a respective said counter-locking device in each of said switching states, and a restoration element which reverses said idle path when said counter-blocking member engages said blocking member.

19. A parking brake actuating device as in claim 18 further comprising a flange component, at least one of said rotary lever input part and said rotary lever output part being rotatably mounted in said flange component.

20. A parking brake actuating device as in claim 19 wherein said parking brake arrangement comprises a housing, said flange component being stationary with respect to said housing.

21. A parking brake actuating device as in claim 20 wherein said housing has a through-opening for said rotary lever output part.

22. A parking brake actuating device as in claim 19 wherein said rotary lever input part has a shaft portion which is rotatable in said flange component.

23. A parking brake actuating device as in claim 18 wherein the idle path is defined by one of said rotary lever input part and said rotary lever output part.

24. A parking brake actuating device as in claim 18 further comprising a stop element which limits the rotation of the rotary lever input part relative to the rotary lever output part.

25. A parking brake actuating device as in claim 23 wherein said stop element comprises a pin which extends radially from the rotational axis of one of the rotary lever input part and the rotary lever output part.

26. A parking brake actuating device as in claim 18 wherein said restoring element is anchored to the rotary lever input part and to the rotary lever output part.

27. A parking brake actuating device as in claim 18 wherein said restoring element comprises a spring.

28. A parking brake actuating device as in claim 18 wherein the rotary lever input part and the rotary lever output part are axially secured.

29. A parking brake actuating device as in claim 18 wherein said rotary lever output part comprises a shaft which is coaxial to the rotary lever input part.

30. A parking brake actuating device as in claim 18 wherein at least one of the rotary lever input part and the rotary lever output part comprises a shoulder which forms an axial bearing surface for axially supporting the rotary lever input part relative to the rotary lever output part.

31. A parking brake actuating device as in claim 18, wherein said rotary lever output part comprises a roller lever having a freely rotatable roller.

32. A parking brake actuating device as in claim 18 wherein said counter-locking devices are arranged on a common pitch circle one of a flange component part and said rotary lever input part.

33. A parking brake actuating device as in claim 18 comprising a plurality of said pretensioned locking devices axially spaced on one of a flange component part and said rotary lever input part and cooperating with respective ones of said counter-locking devices on the other of said flange component part and said rotary lever input part, said counter-locking devices being offset axially and circumferentially.

34. A parking brake actuating device as in claim 18 wherein said rotary lever arrangement comprises means for sensing the position of the rotary lever output part relative to the rotary lever input part.

35. A parking brake actuating device as in claim 18 further comprising a housing having a through-opening, said rotary lever arrangement being preassembled and positioned in operative connection to said blocking member through the through-opening of the housing.

36. A parking brake actuating device for a parking brake arrangement in a motor vehicle, said parking brake arrangement comprising a blocking member and a counter-blocking member, said actuating device comprising:

a rotary lever arrangement which controls engagement of the blocking member with the counter-blocking member, said rotary lever arrangement comprising a rotary lever input part and a rotary lever output part which are rotatable relative to each other along an idle path when said blocking member is not engaged by said counter-blocking member, wherein the rotary lever input part and the rotary lever output part each have a pair of coupling surfaces which cooperate to define the idle path and enable a switching movement between the rotary lever input part and the rotary lever output part, and a restoration element which reverses said idle path when said counter-blocking member engages said blocking member.

37. A parking brake actuating arrangement as in claim 36 wherein one of the rotary lever input part and the rotary lever output part comprises a segment-shaped cutout in the circumferential direction, said cut-out defining the pair of coupling surfaces of said one of the rotary input part and the rotary output part.

* * * * *